(12) United States Patent
Nakamori et al.

(10) Patent No.: US 8,510,997 B2
(45) Date of Patent: Aug. 20, 2013

(54) DOOR CONSTRUCTION

(75) Inventors: Yoji Nakamori, Gamagori (JP); Yutaka Fujiwara, Okazaki (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 924 days.

(21) Appl. No.: 11/604,212

(22) Filed: Nov. 27, 2006

(65) Prior Publication Data

US 2007/0120394 A1   May 31, 2007

(30) Foreign Application Priority Data

Nov. 28, 2005 (JP) ................ P2005-342552
Sep. 28, 2006 (JP) ................ P2006-265671

(51) Int. Cl.
*B60J 5/00* (2006.01)
(52) U.S. Cl.
USPC .............................. 49/502; 49/351; 296/146.6
(58) Field of Classification Search
USPC ........ 49/348, 349, 351, 352, 502; 293/146.5, 293/146.6; 296/146.5, 146.6
See application file for complete search history.

(56) References Cited

U.S. PATENT DOCUMENTS

| | | | | |
|---|---|---|---|---|
| 4,306,381 A | * | 12/1981 | Presto | 49/502 |
| 4,648,208 A | * | 3/1987 | Baldamus et al. | 49/502 |
| 4,702,040 A | * | 10/1987 | Hellriegel | 49/502 |
| 4,860,496 A | * | 8/1989 | Hellriegel | 49/502 |
| 4,924,630 A | | 5/1990 | Lomasney et al. | |
| 4,945,682 A | * | 8/1990 | Altman et al. | 49/502 |
| 5,033,236 A | * | 7/1991 | Szerdahelyi et al. | 49/502 |
| 5,111,620 A | * | 5/1992 | Lau et al. | 49/502 |
| 5,417,470 A | * | 5/1995 | Holt | 296/187.12 |
| 5,584,144 A | * | 12/1996 | Hisano | 49/502 |

(Continued)

FOREIGN PATENT DOCUMENTS

| | | |
|---|---|---|
| DE | 199 41 192 A1 | 3/2000 |
| JP | 1-122172 U | 8/1989 |

(Continued)

OTHER PUBLICATIONS

Definition of Along—see Action for definition The American Heritage® Dictionary of the English Language, Fourth Edition copyright ©2000 by Houghton Mifflin Company. Updated in 2009. Published by Houghton Mifflin Company. All rights reserved.*

(Continued)

*Primary Examiner* — Katherine Mitchell
*Assistant Examiner* — Justin Rephann
(74) *Attorney, Agent, or Firm* — Birch, Stewart, Kolasch & Birch, LLP

(57) ABSTRACT

A door construction includes a door, comprising an outer panel, and adapted to cover an opening formed in a vehicle body; a side impact bar, disposed in an interior of the door, and extending in a longitudinal direction of the vehicle body; a window regulator, disposed in the interior of the door, and operable to raise and lower a window glass; and a plate-shaped member, disposed in the interior of the door, and adapted to support the window regulator. The plate-shaped member is connected to the side impact bar. The plate-shaped member has a shape following the outer panel. A width of the side impact bar and a width of the window regulator are overlapped with each other in a width direction of the vehicle body.

11 Claims, 6 Drawing Sheets

(56) References Cited

U.S. PATENT DOCUMENTS

| | | | |
|---|---|---|---|
| 6,164,716 A * | 12/2000 | Palazzolo et al. | 296/187.12 |
| 6,231,112 B1 * | 5/2001 | Fukumoto et al. | 296/146.5 |
| 6,425,208 B1 * | 7/2002 | Klueger et al. | 49/502 |
| 7,040,688 B2 * | 5/2006 | White et al. | 296/146.6 |
| 2003/0014921 A1 * | 1/2003 | Jung | 49/349 |
| 2004/0216387 A1 * | 11/2004 | Furuse | 49/502 |

FOREIGN PATENT DOCUMENTS

| | | |
|---|---|---|
| JP | 2-24222 A | 1/1990 |
| JP | 3-96428 A | 4/1991 |
| JP | 5-156861 A | 6/1993 |
| JP | 5-270262 A | 10/1993 |
| JP | 6-504966 A | 6/1994 |
| JP | 2003-94940 A | 4/2003 |

OTHER PUBLICATIONS

Definition of locus—see Action for definition The American Heritage® Dictionary of the English Language, Fourth Edition copyright ©2000 by Houghton Mifflin Company. Updated in 2009. Published by Houghton Mifflin Company. All rights reserved.*

Definition for Seal in Action The American Heritage® Dictionary of the English Language, Fourth Edition copyright ©2000 by Houghton Mifflin Company. Updated in 2009. Published by Houghton Mifflin Company. All rights reserved.* definiton of "along" can be found in the Action The American Heritage® Dictionary of the English Language, Fourth Edition copyright ©2000 by Houghton Mifflin Company. Updated in 2009. Published by Houghton Mifflin Company. All rights reserved.*

* cited by examiner

DOOR CONSTRUCTION

BACKGROUND OF THE INVENTION

1. Field of the Invention

The present invention relates to a door construction which covers and uncovers an opening formed in a vehicle such as a door cut-out for a passenger to get in and out of the vehicle, and more particularly to a door construction having a side impact bar.

2. Description of the Related Art

A side impact bar having a square, angled or round cross section is disposed in an interior of a door which covers and uncovers an opening formed in a vehicle in such a manner as to be connected to front and rear ends of the door at ends thereof in order to enhance the safety against a collision from a side of the vehicle. An opening is formed in an inner panel of the door which is made use of when mounting various types of equipment such as a window regulator for raising and lowering a window glass. There are a couple of types of window regulators: one in which a window glass is raised and lowered using gear wheels and link mechanisms; and the other as described in JP-A-5-156861 in which a wire is extended between pulleys arranged in a vertical direction of a door to cross in an X-shape and part of the wire so extended is wound round a drum, whereby winding directions of the drum is changed by a regulator motor which is a drive source so as to raise and lower a window glass.

In JP-A-5-156861, a rail member having an angled or U-shaped cross section which guides the ascending and descending of the window glass is fixed to a side impact bar, and the pulleys are rotatably supported on a bracket which is fixed to the rail member.

In JP-A-5-156861, while a drive device (a rotary drum, a motor and the like) of the window regulator is mounted on a side beam via a bracket connected to the side beam at one end thereof, since the bracket extends below the side beam, in a case where a side door beam has a transverse width (a width in a width direction of the vehicle), the width of the rotary drum which makes up the window regulator is added to the width of the side door beam, constituting a cause for a disruption against an attempt to reduce the thickness of the door. Overall widths of vehicles are regulated for classifications of vehicles. In particular, in small-sized vehicles whose overall width is regulated to be narrow, since a width of a passenger compartment depends on a width of a door, when attempting to secure as wide as possible a space within a passenger compartment, the reduction in a ratio of the transverse width of the vehicle which is occupied by doors, that is, the reduction in thickness of the door constitutes a very important factor to be considered. When attempting to simply reduce the thickness of the door, the attempt can be accomplished by reducing the width of a side impact bar, but with this adopted in reality, the impact absorption capability at the time of side impact is reduced. In addition, since the bracket is supported at only one end thereof, there is caused a risk that a sufficient mounting rigidity cannot be secured.

SUMMARY

It is therefore an object of the invention to provide a door construction which can realize the reduction in thickness of the door while securing a strength required for the door, as well as secure the mounting rigidity of the window regulator.

DETAIL DESCRIPTION OF THE INVENTION

Figure 1:
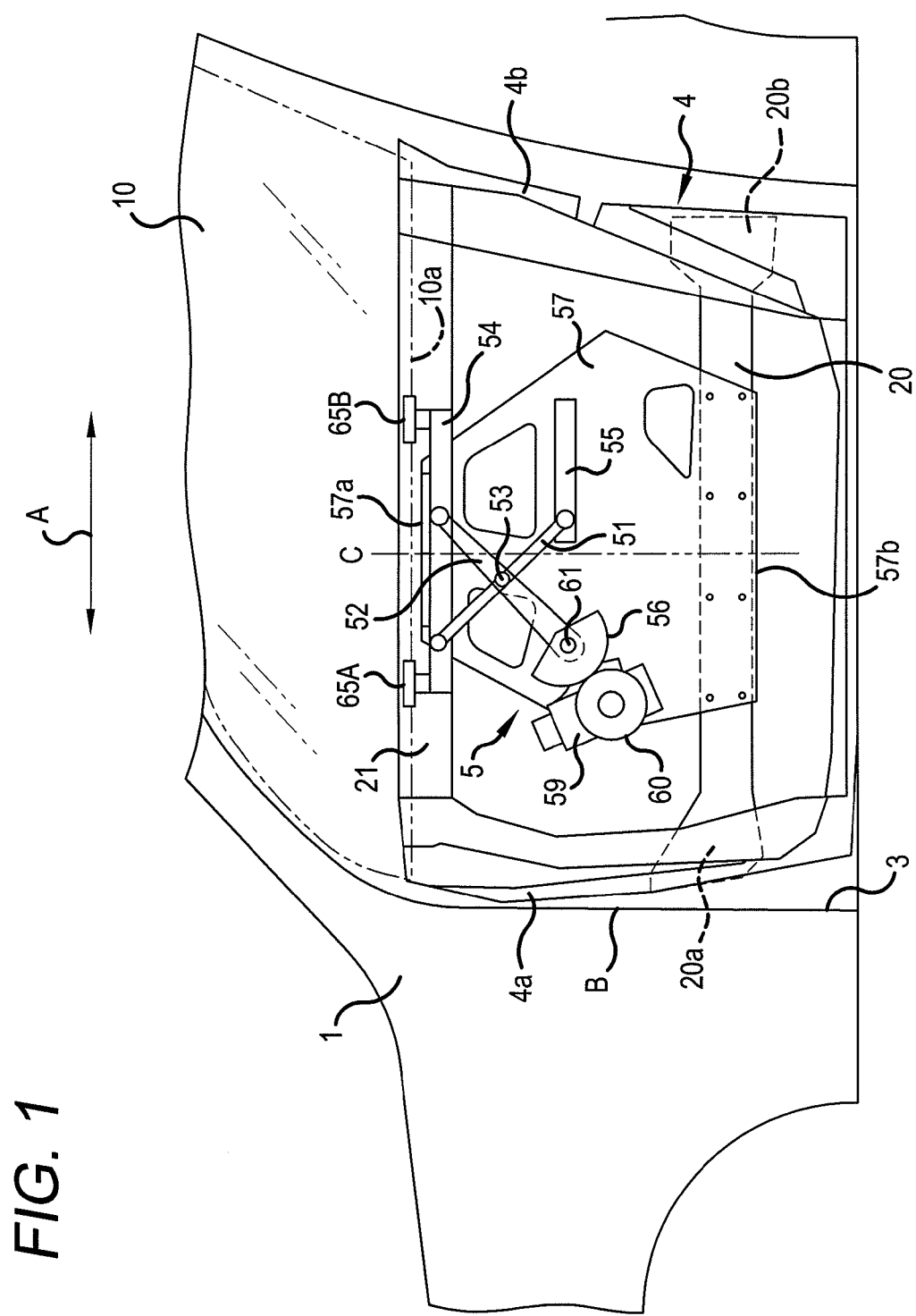
FIG. 1 is a side view showing an embodiment of an automotive door to which a door construction of the invention is applied.

Hereinafter, an embodiment of the invention will be described using the accompanying drawings. In FIG. 1, reference numeral 1 denotes a vehicle body in an interior of which a passenger compartment is formed. Door openings 3 are formed on side portions and at a rear portion of the vehicle body 1 for passengers to get in and out of the passenger compartment and luggage to be loaded and unloaded therefrom. Doors 4 are mounted in the door openings 3, respectively, in such a manner as to be opened and closed to uncover and cover the corresponding door openings 3. This embodiment will be described below by taking for example the front side opening 3 formed in the side portion of the vehicle body and the door 4 adapted to cover and uncover the opening 3.

Figure 2:
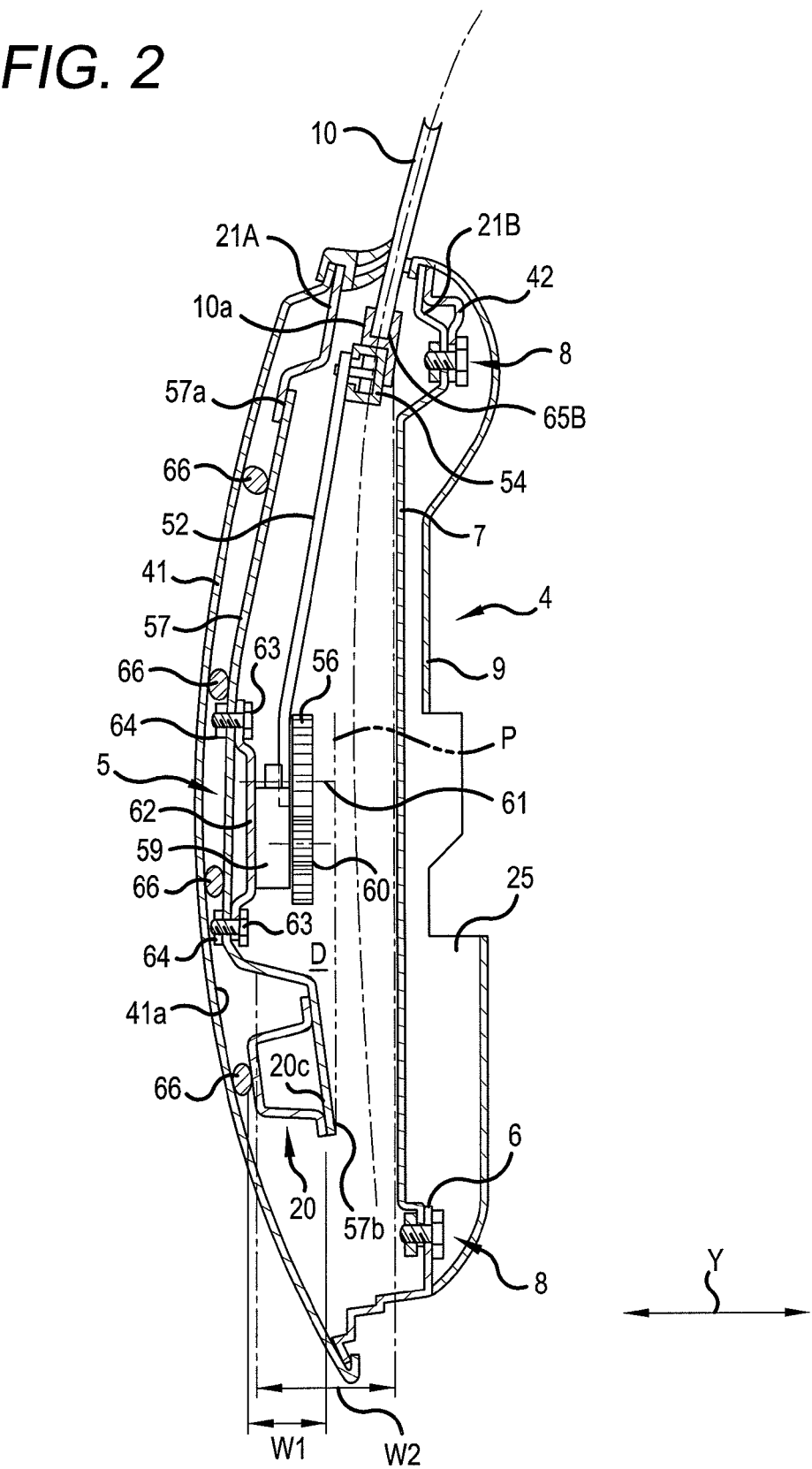
FIG. 2 is an enlarged sectional view showing the door construction.

As shown in FIG. 2, the door 4 is formed into a bag-shaped configuration by joining a metallic outer panel 41 and inner panel 42 together. An opening 6 is formed in the inner panel 42 with a view to enhancing the workability in accommodating equipment in the interior of the door, as well as reducing the weight of the door. A resin panel 7 is fastened to a passenger compartment side of the inner panel 42 with fastening members 8 such as bolts or screws to cover the opening 6.

The resin panel 7 is formed to a size which covers the opening 6. A door trim 9 is mounted on a passenger compartment side of the resin panel 7 in order to hide a fastening portion (the fastening members 8) between the inner panel 42 and the resin panel 7, as well as to form a storage pocket 25 between the resin panel 7 and the door trim 9. The resin panel 7 is formed such that a portion close to its center protrudes transversely further outwards than a periphery of the fixed portion to the inner panel 42.

As shown in FIGS. 1, 2, a side impact bar 20, a belt line reinforcement 21 disposed further upwards than the side impact bar 20, a window regulator 5 for raising and lowering a window glass 10 of the door 4 and a regulator mounting plate 57 on which the window regulator 5 is mounted are provided in an interior of the door 4.

As shown in FIG. 1, the side impact bar 20 extends in a longitudinal direction A of the vehicle body and is provided integrally with the door 4 by being fixed to front and rear ends 4a, 4b of the door 4 at both ends 20a, 20b thereof. In this embodiment, the side impact bar 20 is made up of a plate material which is molded into a shape having a top-hat cross section which has a width (W1). The side impact bar 20 is disposed in the vicinity of an inner surface of the outer panel 41 which is situated transversely further outwards than a window glass raising and lowering locus which is indicated by a chained line in FIG. 2.

As shown in FIG. 2, the belt line reinforcement 21 is made up of a belt line outer reinforcement 21A which is disposed on a side which faces the outer panel 41 and a belt line inner reinforcement 21B which is disposed on a side which faces the inner panel 42. These belt line outer reinforcement 21A and belt line inner reinforcement 21B are plate-shaped members on which irregularities are formed and extend, as shown in FIG. 1, in a longitudinal direction A of the vehicle body, and being provided integrally with the door 4 by being connected to the front and rear ends 4a, 4b of the door at both ends thereof, respectively.

To describe in greater detail, the belt line outer reinforcement 21A is joined to the outer panel 41, whereas the belt line inner reinforcement 21B is joined to the inner panel 42, whereby both the reinforcements are provided integrally with the door 4.

The regulator mounting plate 57 is spot welded to the belt line reinforcement 21 at an upper end 57a and to the side impact bar 20 at a lower end 57b thereof, whereby the regulator mounting plate 57 is connected thereto in such a manner as to be extended between the belt line reinforcement 21 and the side impact bar 20. Openings are formed at several locations in the regulator mounting plate 57 with a view to reducing the weight thereof. The regulator mounting plate 57 is formed such that a plate surface thereof follows the configuration of the outer panel 41.

The window regulator 5 includes, as is shown in FIG. 1, regulator arms 51, 52 which are disposed round a shaft 53 in an X formation, sliders 54, 55 which support slidably longitudinally upper ends of the regulator arms 51, 52 and a lower end of the regulator arm 52, respectively, a sector gear 56 mounted at a lower end of the regulator arm 52, a drive gear 60 which meshes with the sector gear 56 and a regulator motor 59 as a drive source for rotationally driving the drive gear 60.

The sliders 54, 55 are fixed to the regulator mounting plate 57 such that their sliding directions become horizontal while defining a vertical space therebetween. Holders 65A, 65B for holding a lower end 10a of the window glass 10 are formed at both ends of the slider 54. The sector gear 56 is rotatably supported on a base plate 62 and at a lower end of the regulator arm 51 by a shaft 61. As shown in FIG. 2, the regulator motor 59 is fixed to the regulator mounting plate 57 via the base plate 62 which is fastened and fixed to the regulator mounting plate 57 with pluralities of bolts 63 and nuts 64. As shown in FIG. 1, these regulator motor 59 and the base plate 62 are disposed at a front end portion (B) of the door 4 which lies closer to an opening/closing proximal end side of the door 4 than a longitudinal center (C) of the door 4. The regulator motor 59 is disposed within a space D which is defined between an inner surface 41a of the outer panel 41 and a prolonged line P from a surface 20c of the side impact bar 20 which lies to face the passenger compartment, and a width (W1) of the side impact bar 20 and a width (W2) of the window regulator are made to overlap each other in the transverse direction (in the width direction Y of the vehicle).

A mastic sealer 66 (seal member) is applied between the outer panel 41 and panels which face the same panel, that is, the regulator mounting plate 57 and the side impact bar 20, so that the facing panels are integrated with the outer panel 41, and the regulator mounting plate 57 extends along the outer panel 41 closely thereto via the mastic sealer 66, so as to prevent beat noise that is generated when the door is opened/closed.

In the configuration that has been described heretofore, when the drive gear 60 is rotated counterclockwise in FIG. 1 by the regulator motor 59, the regulator arms 51, 52 move in such a manner as to be expanded about the shaft 53, whereby the window glass 10 is lowered. When the drive gear 60 is rotated clockwise in FIG. 1 by the regulator motor 59, the regulator arms 51, 52 move in such a manner as to be contracted about the shaft 53, whereby the window glass 10 is raised.

In this embodiment, since the regulator mounting plate 57 is connected to the side impact bar 20 having the transverse width (W1) and the regulator motor 59 is disposed within the space D defined between the inner surface 41a of the outer panel 41 and the prolonged line P from the passenger compartment side surface of the side impact bar 20, whereby the width (W1) of the side impact bar 20 and the width (W2) of the window regulator are made to overlap each other in the transverse direction, the thickness of the door 4 can be reduced by such an extent that the widths of the side impact bar 20 and the window regulator overlap each other while enhancing the rigidity of the door 4, compared to a case where the side impact bar and the window regulator are made to face each other in the transverse direction.

In addition, since the configuration of the regulator mounting plate 57 is formed to follow the outer panel 41 which makes up the door 4, an extra space in the interior of the door can be reduced, thereby making it possible to reduce the thickness of the door efficiently.

Furthermore, since the window regulator is mounted on the regulator mounting plate 57 which is connected to the side impact bar 20 and the belt line reinforcement 21 which are provided originally on the door 4, even in the event that the regulator mounting plate 57 is formed into the plate-shaped member, the thickness of the door can be reduced efficiently while enhancing the mounting rigidity thereof. In addition, since the mounting rigidity of the regulator mounting plate 57 is enhanced, the rigidity of the door 4 is also enhanced.

Since the regulator motor 59 is disposed within the space D defined between the inner surface 41a of the outer panel 41 and the prolonged line P from the passenger compartment side surface of the side impact bar 20, the thickness of the door 4 can be reduced by an extent equaling the width of the regulator motor 59.

Figure 3:
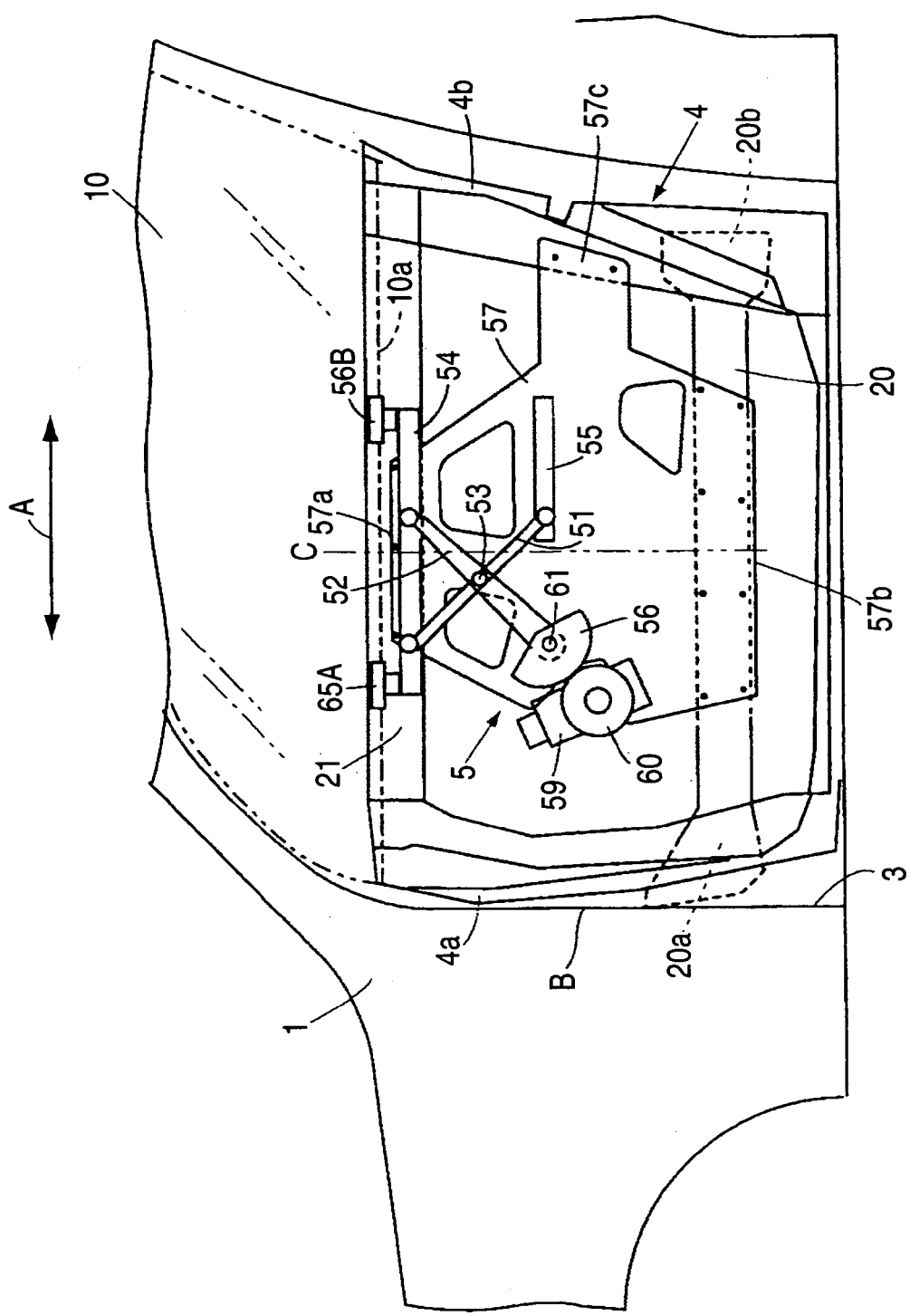
FIG. 3 is a side view showing another form of a fixing construction of a regulator mounting plate on which a window regulator is mounted.

In FIGS. 1, 2, while the regulator mounting plate 57 is described as the two-point fixing construction in which the regulator mounting plate 57 is connected to the side impact bar 20 and the belt line reinforcement 21 at the upper end 57a and the lower end 57b thereof, the invention is not limited to the fixing construction. For example, as is shown in FIG. 3, the rear end 57c of the regulator mounting plate 57 is partially extended to the rear of the vehicle so as to be spot welded to the rear end 4b of a strength maintaining member, including the beltline reinforcement 21 and the front and rear ends 4a, 4b, which makes up a rear edge portion of the door 4, realizing a three-point fixing construction. By adopting such a configuration, the mounting rigidity of the regulator mounting plate 57 can be enhanced further while realizing the reduction in thickness of the door 4.

Figure 4:
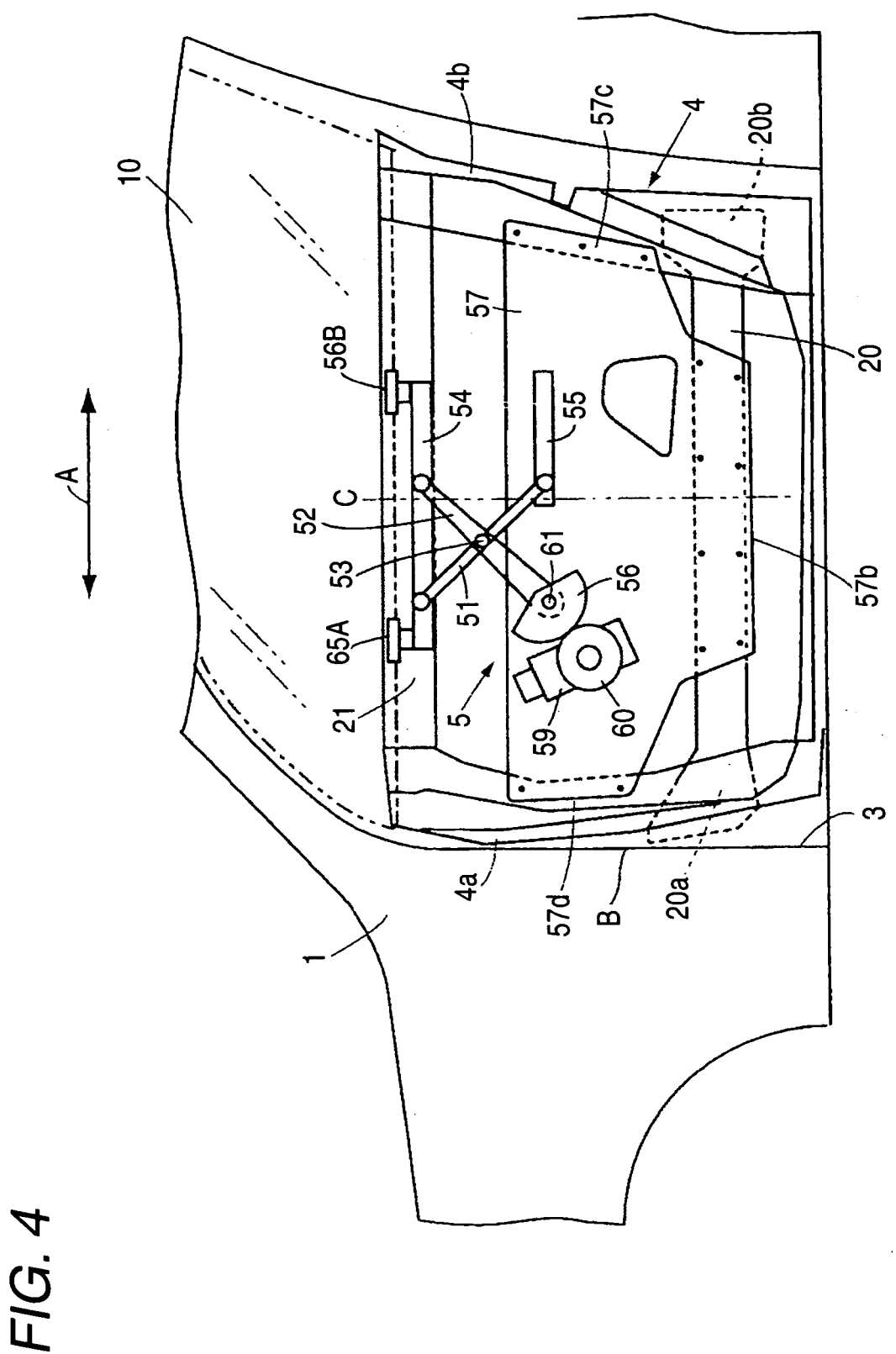
FIG. 4 is a side view showing a further form of a fixing construction the regulator mounting plate on which the window regulator is mounted.

As the three-point fixing construction, as is shown in FIG. 4, with the lower end 57b of the regulator mounting plate 57 kept fixed to the side impact bar 20, the rear end 57c and the front end 57d may be fixed to the rear end 4b of the strength maintaining member which makes up the rear edge portion and the front end 4a of a strength maintaining member 72 which makes up the front edge portion of the door 4, respectively, by means of spot welding.

Figure 5:
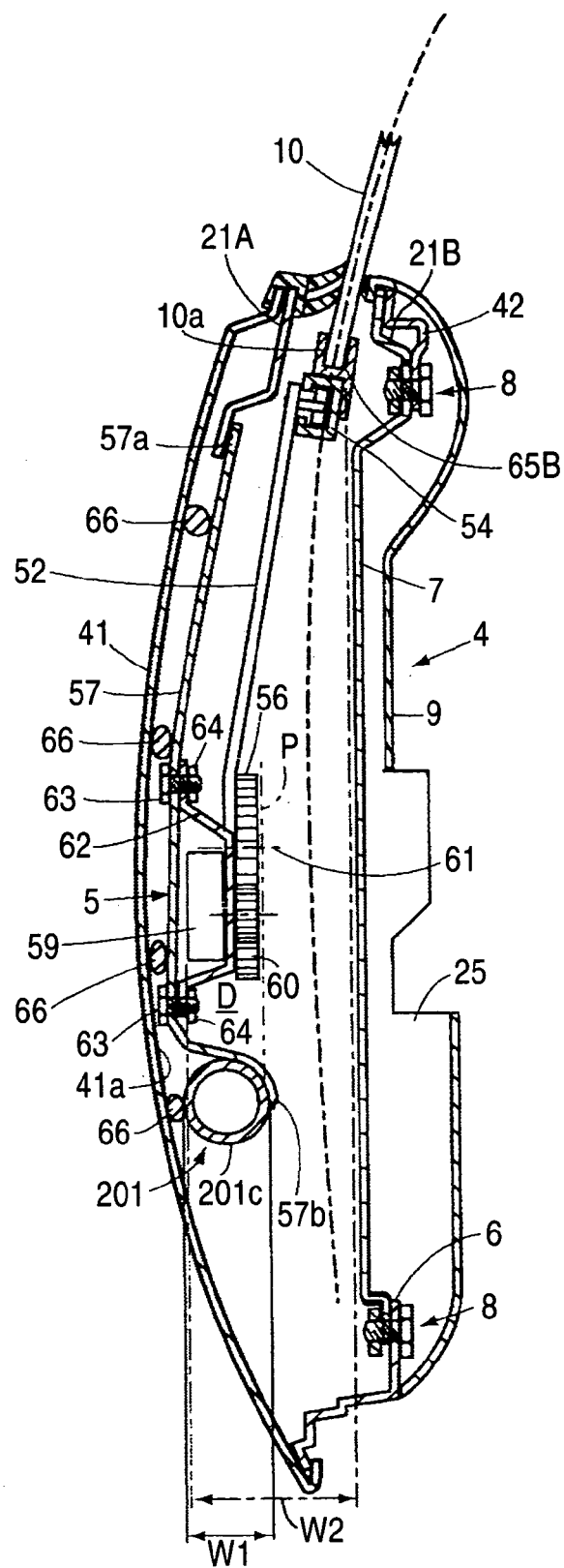
FIG. 5 is a sectional view of a door construction in which a pipe-shaped side impact bar is provided.

In FIGS. 1, 2, while the side impact bar 20 is formed into the plate-shaped member having the top-hat cross section which has the width (W1) so as to provide the rigidity, a side impact bar 201 which is made up of a pipe as shown in FIG. 5 may be adopted. In this case, the upper end 57a of the regulator mounting plate 57 may be fixed to the belt line outer reinforcement 21A by means of spot welding, while the lower end 57b thereof may be fixed to an outer circumferential surface 201a of the side impact bar 201 by means of arc welding.

In addition, the regulator mounting plate 57 may be fixed to the transversely internal surface of the side impact bar 20 as shown in FIG. 2 or the regulator mounting plate 57 may be fixed to an upper surface and a transversely internal surface of the side impact bar 201 as shown in FIG. 5, and the portion of the regulator mounting plate 57 which lies further upwards than the side impact bar may be formed such that the vertical cross section is curved to follow the outer panel 41.

As to the arrangement of the regulator motor 59, the regulator motor 59 may be disposed between the base plate 62 and the regulator mounting plate 57. By adopting this configuration, the movement of the regulator motor 59 towards the passenger compartment as a result of a side collision can be suppressed by the base plate 62, thereby making it possible to enhance the safety.

Figure 6:
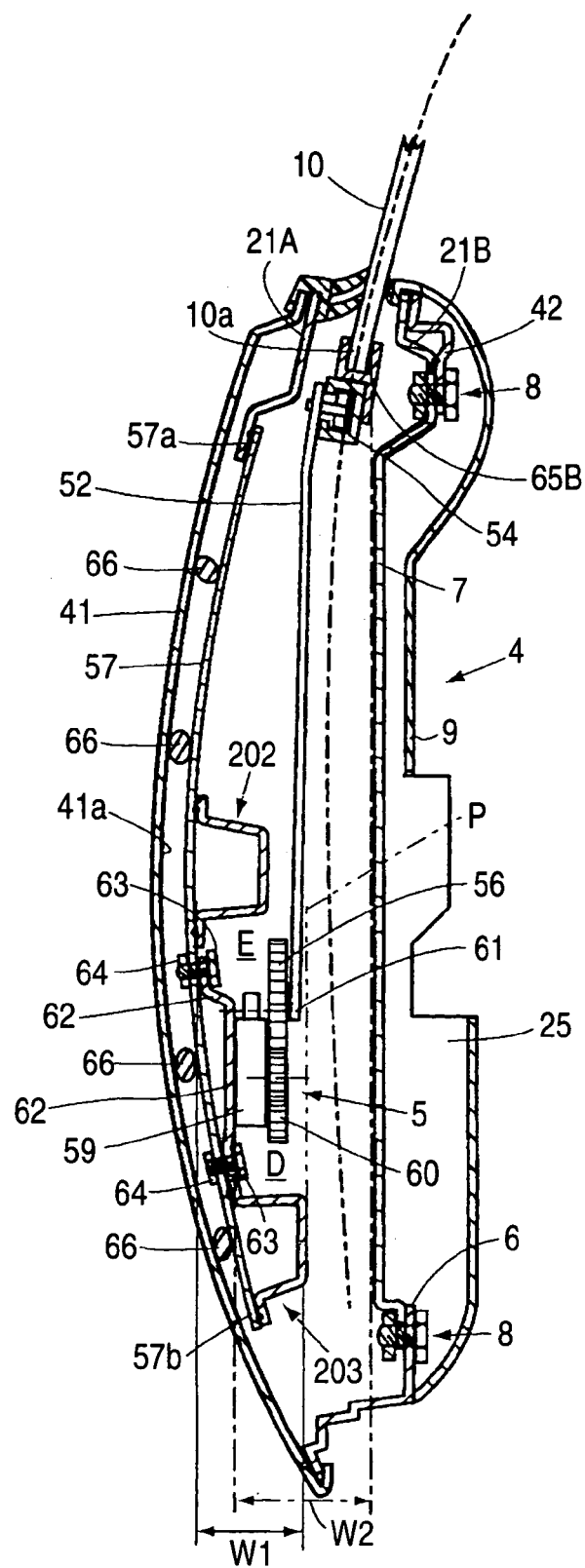
FIG. 6 is a sectional view of a door construction in which upper and lower side impact bars are provided.

As the form of the side impact bar, the invention is not limited to the form described above in which the single impact bar is provided, and for example, as shown in FIG. 6, a form may be adopted in which two side impact bars arranged in such a manner as to define a vertical space therebetween. In this case, the upper end 57a of the regulator mounting plate 57 may be fixed to the belt line outer reinforcement 21A, whereas the lower end 57b thereof may be fixed to side impact bars 202, 203, respectively, by means of spot welding.

In this case, a base plate 62 can be fixed to a regulator mounting plate 57 which is situated in a space E defined between the side impact bar 202 and the side impact bar 203, a regulator motor 59 and a shaft 61 can be mounted on the base plate 62, and the regulator motor 59, a sector gear 56 and a drive gear 60 can be disposed in the space E. By disposing the regulator motor 59, the sector gear 56 and the drive gear 60 in this space E, a transverse thickness of the door 4 can be suppressed, thereby making it possible to realize the reduction in thickness of the door 4 while enhancing the strength thereof.

What is claimed is:

1. A door construction including a door, the door construction comprising:
    a door outer panel that covers an opening formed in a vehicle body;
    a side impact bar disposed in an interior of the door, the side impact bar extending in a longitudinal direction of the vehicle body;
    a window regulator disposed in the interior of the door, the window regulator including an X-shaped arm for raising and lowering a window glass on a locus which is a path on which the window glass travels during raising and lowering, a slider supporting slidably longitudinally a lower end of the arm, and a motor driving the arm; and
    a regulator mounting plate disposed in the interior of the door, the regulator mounting plate attached to and supporting the window regulator, the regulator mounting plate formed with the slider, wherein
    the regulator mounting plate extends along the door outer panel,
    a width of the side impact bar and a width of the motor are overlapped with each other in a width direction of the vehicle body,
    the side impact bar and the window regulator are disposed more outwardly of the vehicle body in the width direction of the vehicle body than the locus,
    the width direction includes a first direction and a second direction opposite to the first direction,
    the motor is mounted on a first portion of the regulator mounting plate,
    the first portion of the regulator mounting plate faces in the first direction,
    the side impact bar is attached to a second portion of the regulator mounting plate and is disposed between the door outer panel and the regulator mounting plate, and
    the second portion of the regulator mounting plate faces in the second direction.

2. The door construction according to claim 1, further comprising:
    a strength maintaining member provided in a vicinity of an outer edge portion of the door outer panel, wherein
    a lower end of the regulator mounting plate is connected to the side impact bar, and
    at least one of an upper end, a front end and a rear end of the regulator mounting plate is connected to the strength maintaining member.

3. The door construction according to claim 1, further comprising:
    a belt line reinforcement member arranged at an upper side of the side impact bar and in a vicinity of an upper edge portion of the door outer panel, wherein
    a lower end of the regulator mounting plate is connected to the side impact bar, and
    an upper end of the regulator mounting plate is connected to the belt line reinforcement member.

4. The door construction according to claim 1, further comprising:
    a belt line reinforcement member arranged at an upper side of the side impact bar and in a vicinity of an upper edge portion of the door outer panel, wherein a lower end of the regulator mounting plate is connected to the side impact bar, and
    an upper end of the regulator mounting plate is connected to the belt line reinforcement member,
    a seal member is provided between the regulator mounting plate and the door outer panel, and
    the regulator mounting plate extends along the door outer panel via the seal member.

5. The door construction according to claim 1, wherein
    a seal member is provided between the regulator mounting plate and the door outer panel, and
    the regulator mounting plate extends along the outer panel via the seal member.

6. The door construction according to claim 1, wherein
    a lower end of the regulator mounting plate is connected to one of an upper surface and an inner surface of the side impact bar, and
    a vertical section of a portion of the regulator mounting plate which lies at an upper side of the side impact bar is curved and extends along the door outer panel.

7. The door construction according to claim 1, wherein
    a plurality of the side impact bar are arranged in a vertical direction with an interval, and
    the regulator mounting plate is connected to the plurality of the side impact bar, respectively.

8. The door construction according to claim 1, wherein
    a drive source of the window regulator, which includes the motor, is disposed within a space defined between an inner surface of the outer panel and an innermost portion of the side impact bar in the width direction of the vehicle body.

9. The door construction according to claim 1, wherein
    a drive source of the window regulator, which includes the motor, is arranged closer to an opening and closing proximal end portion of the door outer panel than a center line, which extends in a vertical direction, of the door outer panel with respect to the longitudinal direction of the vehicle body.

10. The door construction according to claim 1, wherein the regulator mounting plate is connected at one end to the side impact bar and is connected to the door outer panel at a strength maintaining member at no more than two other ends of the regulator mounting plate.

11. The door construction according to claim 1, wherein the motor is attached to the regulator mounting plate by a plurality of nuts and bolts at spaced locations adjacent a plurality of sealer members.

\* \* \* \* \*